(12) United States Patent
Bowman et al.

(10) Patent No.: US 10,463,147 B2
(45) Date of Patent: Nov. 5, 2019

(54) SIT-STAND WORKSTATION WITH ADJUSTABLE KEYBOARD TRAY

(71) Applicant: Innovative Office Products, LLC, Easton, PA (US)

(72) Inventors: Stephen J. Bowman, Saylorsburg, PA (US); Matthew A. Sommerfield, Allentown, PA (US)

(73) Assignee: Innovative Office Products, LLC, Easton, PA (US)

( * ) Notice: Subject to any disclaimer, the term of this patent is extended or adjusted under 35 U.S.C. 154(b) by 0 days.

(21) Appl. No.: 16/002,291

(22) Filed: Jun. 7, 2018

(65) Prior Publication Data
US 2018/0352950 A1    Dec. 13, 2018

Related U.S. Application Data

(60) Provisional application No. 62/548,071, filed on Aug. 21, 2017, provisional application No. 62/517,674, filed on Jun. 9, 2017.

(51) Int. Cl.
*A47B 21/03* (2006.01)
*A47B 21/02* (2006.01)
(Continued)

(52) U.S. Cl.
CPC ............ *A47B 21/0314* (2013.01); *A47B 9/20* (2013.01); *A47B 21/02* (2013.01); *A47B 23/042* (2013.01);
(Continued)

(58) Field of Classification Search
CPC .................. A47B 21/02; A47B 23/042; A47B 2021/0364; A47B 2200/0085; A47B 21/01314
(Continued)

(56) References Cited

U.S. PATENT DOCUMENTS 6,038,986 A * 3/2000 Ransil .................. A47B 9/02
108/145
6,691,626 B2 * 2/2004 Warner ................ A47B 9/00
108/145

(Continued)

OTHER PUBLICATIONS

Ergotron Workfit-A[online], [retrieved on Jun. 5, 2018] Retreived from the internet: ,https://www.staples.com/Ergotron-WorkFit-A-Display-Stand-With-Suspended-Keyboard-Single-HD-Black/product_IM1RJ5889.*

(Continued)

*Primary Examiner* — Jose V Chen
(74) *Attorney, Agent, or Firm* — Design IP

(57) ABSTRACT

The present disclosure relates to an adjustable workstation for attaching to a support surface. The workstation includes a base having at least one fastener for securing the base to the support surface and a column attached to the top surface of the base. The column includes a lift configured to move between a lowered position adjacent to the support surface and a raised position located between the top end and the bottom end of the column. Attached to the lift is a worksurface having a front edge, and an extending member connects the lift to the worksurface. The extendable member is configured to adjust the location of the worksurface longitudinally from a retracted position to an extended position, wherein the front edge of the worksurface is vertically alignable with the front edge of the support surface when the extending member is in the extended position.

8 Claims, 12 Drawing Sheets

(51) Int. Cl.
*A47B 23/04* (2006.01)
*A47B 9/20* (2006.01)
*F16M 13/02* (2006.01)
*A47B 9/10* (2006.01)
*A47B 9/12* (2006.01)

(52) U.S. Cl.
CPC ............... *F16M 13/02* (2013.01); *A47B 9/10* (2013.01); *A47B 9/12* (2013.01); *A47B 2021/0335* (2013.01); *A47B 2021/0364* (2013.01); *A47B 2200/0085* (2013.01)

(58) Field of Classification Search
USPC ..... 108/138, 145, 143, 147, 147.11, 147.18; 248/421
See application file for complete search history.

(56) References Cited

U.S. PATENT DOCUMENTS

| | | | | |
|---|---|---|---|---|
| 8,065,966 | B1* | 11/2011 | Bacon | A47B 9/16 108/145 |
| 8,544,391 | B2* | 10/2013 | Knox | B60N 3/063 108/12 |
| 8,671,853 | B2* | 3/2014 | Flaherty | A47B 9/18 108/138 |
| 9,049,923 | B1* | 6/2015 | Delagey | A47B 9/18 |
| 9,055,810 | B2 | 6/2015 | Flaherty | |
| 9,332,839 | B2* | 5/2016 | Ringlein | A47B 87/002 |
| 9,504,316 | B1* | 11/2016 | Streicher | A47B 21/02 |
| 9,615,655 | B1* | 4/2017 | Huang | A47B 9/16 |
| 9,668,572 | B2* | 6/2017 | Ergun | A47B 9/16 |
| 9,681,746 | B1* | 6/2017 | Chen | A47B 9/02 |
| 9,854,904 | B2* | 1/2018 | Getz | A47B 97/00 |
| 9,888,766 | B2* | 2/2018 | Chuang | A47B 9/16 |
| 9,961,991 | B1* | 5/2018 | Chen | A47B 21/02 |
| D830,739 | S* | 10/2018 | Min | D6/655 |
| 10,111,518 | B2* | 10/2018 | Blackburn | A47B 21/02 |
| 10,159,336 | B2* | 12/2018 | Liao | A47B 9/16 |
| 2015/0159804 | A1* | 6/2015 | Bowman | F16M 11/045 248/122.1 |
| 2017/0013957 | A1* | 1/2017 | McRorie, III | A47B 21/02 |
| 2017/0049224 | A1* | 2/2017 | Kim | A47B 21/02 |
| 2017/0290413 | A1* | 10/2017 | Hu | A47B 21/02 |
| 2017/0354245 | A1* | 12/2017 | Martin | A47B 21/02 |
| 2018/0000239 | A1* | 1/2018 | Knox | A47B 9/18 |
| 2018/0055214 | A1* | 3/2018 | Kim | A47B 9/10 |
| 2018/0125227 | A1* | 5/2018 | Xiang | A47B 21/02 |
| 2018/0228279 | A1* | 8/2018 | Guzman | A47B 9/14 |
| 2018/0279770 | A1* | 10/2018 | Crowe | A47B 9/16 |

OTHER PUBLICATIONS

Ergotron Workfit-S [online], [retrieved on Jun. 5, 2018] Retrieved from the internet: <https://www.ergotron.com/en-us/products/product-details/33-349#/?color=black>.

Ergotron Workfit-SR [online], [retrieved on Jun. 5, 2018] Retrieved from the internet: <https://www.ergotron.com/en-us/products/product-details/33-407#/?color=black>.

Ergotron WorkFit-LX [online], [retrieved on Jun. 5, 2018] Retrieved from the internet: <https://www.ergotron.com/en-us/products/product-details/45-405#/>.

* cited by examiner

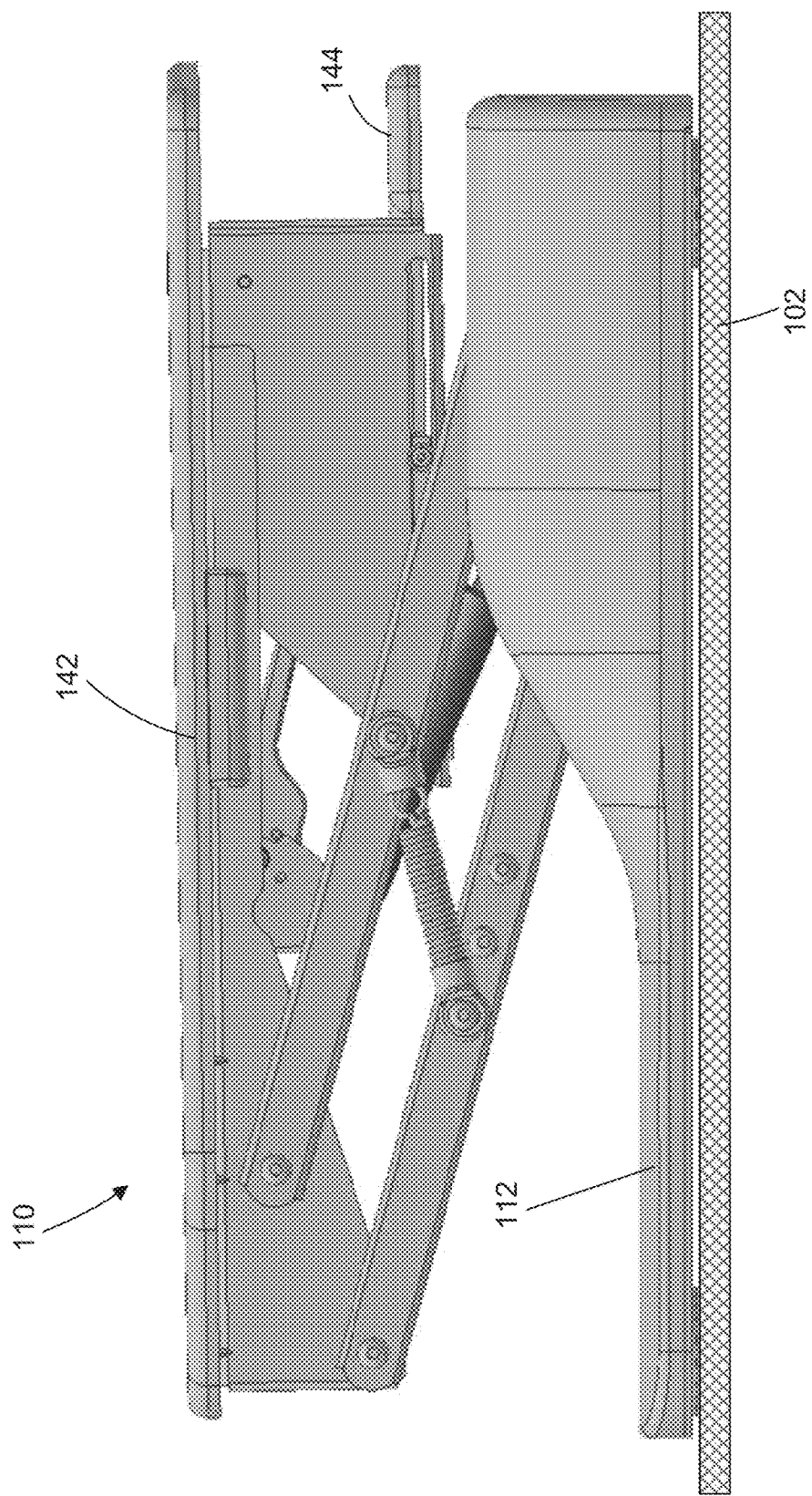

SIT-STAND WORKSTATION WITH ADJUSTABLE KEYBOARD TRAY

BACKGROUND

The use of height-adjustable apparatuses that permit users to change the elevation of their one or more display devices are becoming increasingly popular. Many such apparatuses include column-based apparatuses which incorporate a lifting mechanism that raise an electronic display and a worksurface area, on which a keyboard and other peripherals may be placed, together when the user wishes to move to a standing position. Other types of sit-stand apparatuses are of a "collapsible" tabletop configuration. Such apparatuses have become attractive because they can be utilized on multiple types of support surfaces and do not occupy large amounts of space.

However, while such apparatuses are highly adjustable vertically, the attached worksurfaces are typically sized and shaped to be shorter in depth than the depth of the support surfaces (e.g., existing desks or tables) on which they sit. As a result, when these apparatuses are in a lowered position, the worksurface rests against the support surface and creates a multi-level surface that can create discomfort to the user, particularly when the user is resting his/her arms on both the worksurface and the support surface at the same time. Thus, there is a need for an improved sit-stand workstation that eliminates this potential for discomfort.

SUMMARY OF THE DISCLOSURE

In view of the foregoing background, an adjustable workstation which is supportable from a support surface is disclosed. The workstation includes a base having a top surface, a bottom surface, optionally at least one clamp or other fastener for securing the base to the support surface, a column having a top end and a bottom end, the bottom end of the column being attached to the top surface of the base, the column including a lift configured to move between a lowered position adjacent to the bottom end of the column and a raised position located between the top end and the bottom end of the column; a worksurface attached to the lift, the worksurface extending between a rear edge located proximate to the column and a front edge located distant from the column; and an extending member connecting the lift to the worksurface, the extending member being configured to move the location of the worksurface from a retracted position to an extended position, wherein the front edge of the worksurface is aligned with the front edge of the support surface when the extending member is in the extended position.

BRIEF DESCRIPTION OF THE DRAWINGS

For a more complete understanding of the present disclosure, reference is made to the following detailed description of an embodiment considered in conjunction with the accompanying drawings, in which:

FIG. 14 is a side view of the sit-stand workstation of FIG. 6, with the workstation in its fully lowered position and the lower worksurface thereof in its fully stowed position.

DETAILED DESCRIPTION

Figure 1:
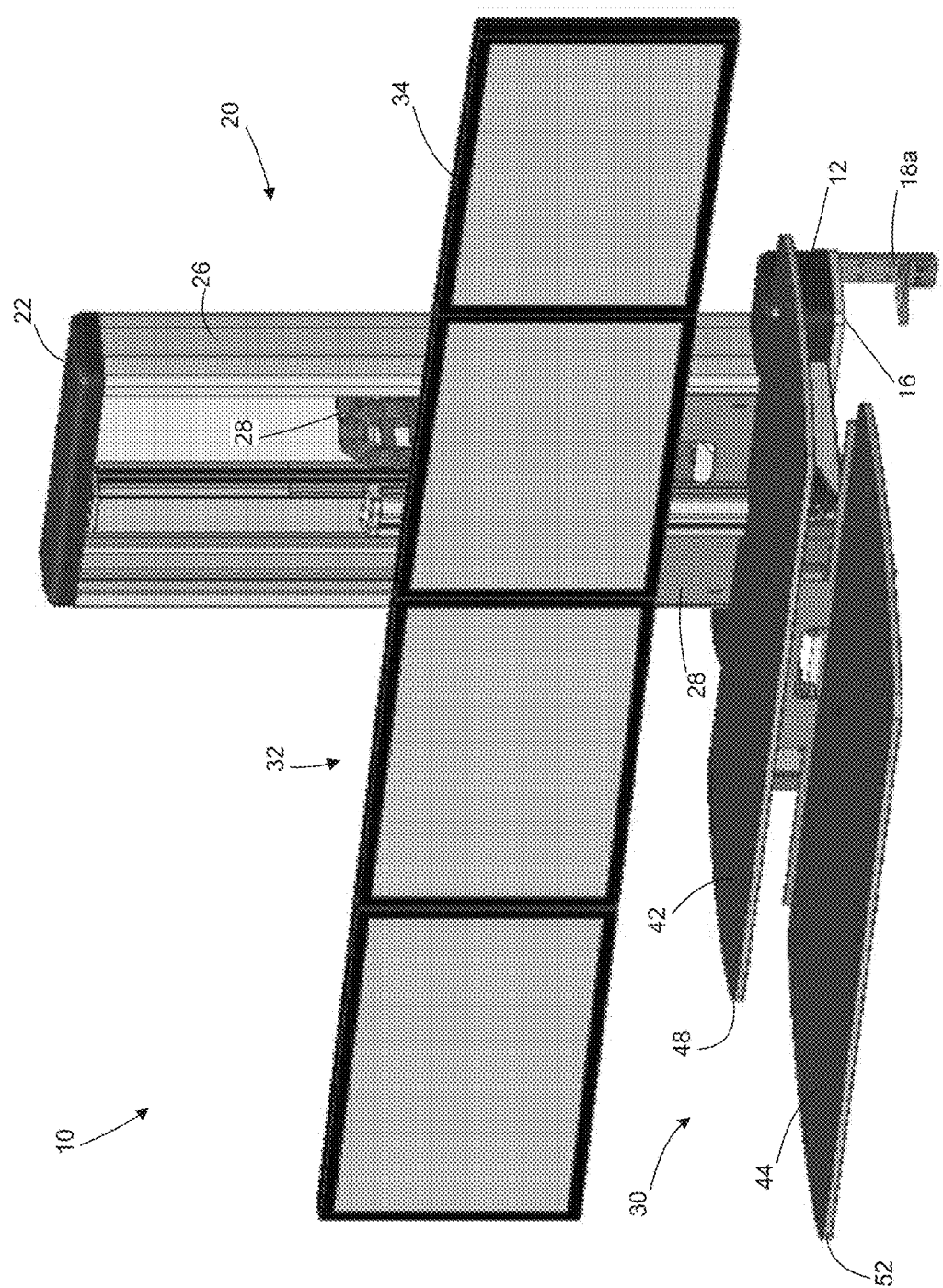
FIG. 1 is a top-front perspective view of a sit-stand workstation constructed in accordance with an embodiment of the present disclosure.
Figure 2:
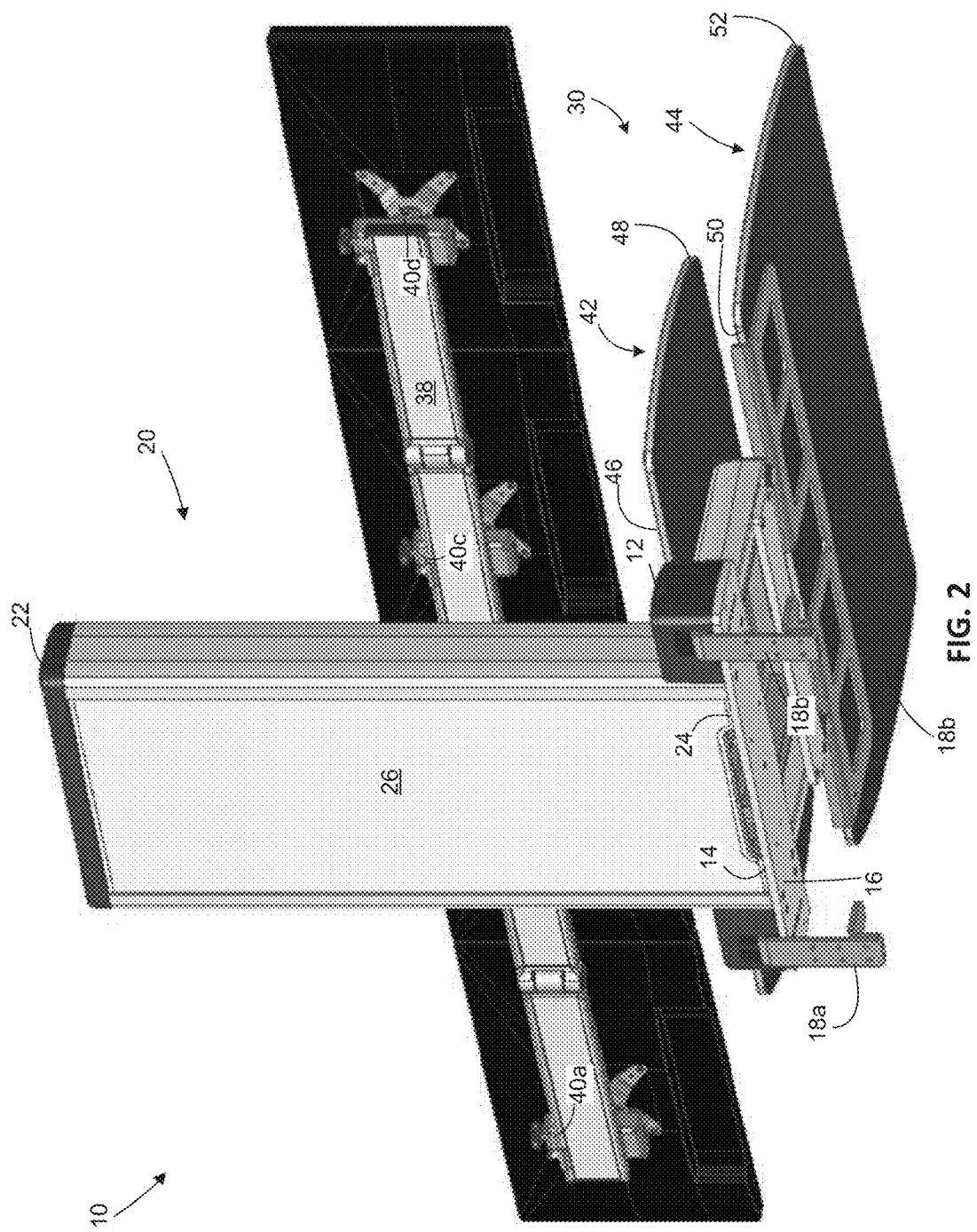
FIG. 2 is a bottom-rear perspective view of the sit-stand workstation shown in FIG. 1.

The following disclosure is presented to provide an illustration of the general principles of the present disclosure and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign particular meaning. Further, it should be noted that, as recited in the specification and in the claims appended hereto, the singular forms "a," "an," and "the" include the plural referents unless otherwise stated. Additionally, the terms "comprises" and "comprising" when used herein specify that certain features are present in that embodiment, but should not be interpreted to preclude the presence or addition of additional features, components, operations, and/or groups thereof.

The following disclosure is intended to be read in connection with the accompanying drawings, which are to be considered part of the entire written description of the disclosure. The drawing figures are not necessarily to scale and certain features of the disclosure may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

Referring now to FIGS. 1-5, a sit-stand workstation 10 constructed in accordance with an embodiment of the present disclosure is shown. The workstation 10 includes a base 12 for supporting the workstation 10 from an existing support surface 2, the support surface 2 being substantially planar and having a front edge 4 and a rear edge 6. The support surface 2 may be, for example, an existing desktop surface or a table top. The base 12 has a top surface 14 and a bottom surface 16, the bottom surface 16 being substantially planar and resting against the support surface 2 when the workstation 10 is in use. In one embodiment, the base 12 includes a pair of fasteners 18a, 18b that are sized and shaped to secure the workstation 10 to the support surface 2. In one embodiment, the fasteners 18a, 18b are clamps that are configured to clamp around the rear edge 6 of the support surface 2. In other embodiments, the bottom surface 16 may rest on the support surface 2 such that the workstation 10 is supported form the support surface 2 without any fastening or clamping means.

In this embodiment, attached to the base 12 is a column 20 having a top end 22, a bottom end 24, and a column body 26 extending between the top end 22 and the bottom end 24, where the bottom end 24 of the column 20 is attached to the top surface 14 of the base 12. The column 20 includes a lift 28 located within the column body 26 that is configured to move an attached worksurface 30 upwardly and downwardly between a lowered position and a raised position, wherein the lowered position locates the worksurface 30 against the support surface 2, and the raised position locates the worksurface 30 between the top end 22 and the bottom end 24 of the column 20. Also attached to the lift 28 is a monitor support assembly 32 that is constructed to support at least one electronic display 34, such as a plurality of computer monitors. In one embodiment, the monitor support assembly 32 includes a monitor support column 36, a monitor support beam 38, and at least one monitor bracket 40 (see monitor brackets 40a-d in FIG. 2). The lift 28 operates to collectively move the worksurface 30 and the monitor support assembly 32 upwardly and downwardly based on mechanisms well known in the art, including, but not limited to, a rack and pinion mechanism, a worm gear mechanism, a screw lift, and a pneumatic spring or cylinder. In one embodiment, the lift 28 is driven electrically by an exterior power source (e.g., a wall outlet). In one embodiment, the lift 28 and the monitor support assembly 32 are constructed in accordance with the embodiment illustrated and described in U.S. patent application Ser. No. 15/408,904, the disclosure of which is incorporated by reference herein in its entirety.

In one embodiment, the worksurface 30 includes an upper worksurface 42 and a lower worksurface 44. The upper worksurface 42 is attached to the lift 28 directly and extends from a rear edge 46 that is proximate to the column 20 to a front edge 48 that is distal to the column 20. The lower worksurface 44 is positioned at a height below the upper worksurface 42 and extends from a rear edge 50 located proximate to the column 20 to a front edge 52 located distant from the column 20. Both of the upper worksurface 42 and the lower worksurface 44 are planar and are positioned to be substantially parallel (i.e., within 2° of parallel) to each other.

Figure 3:
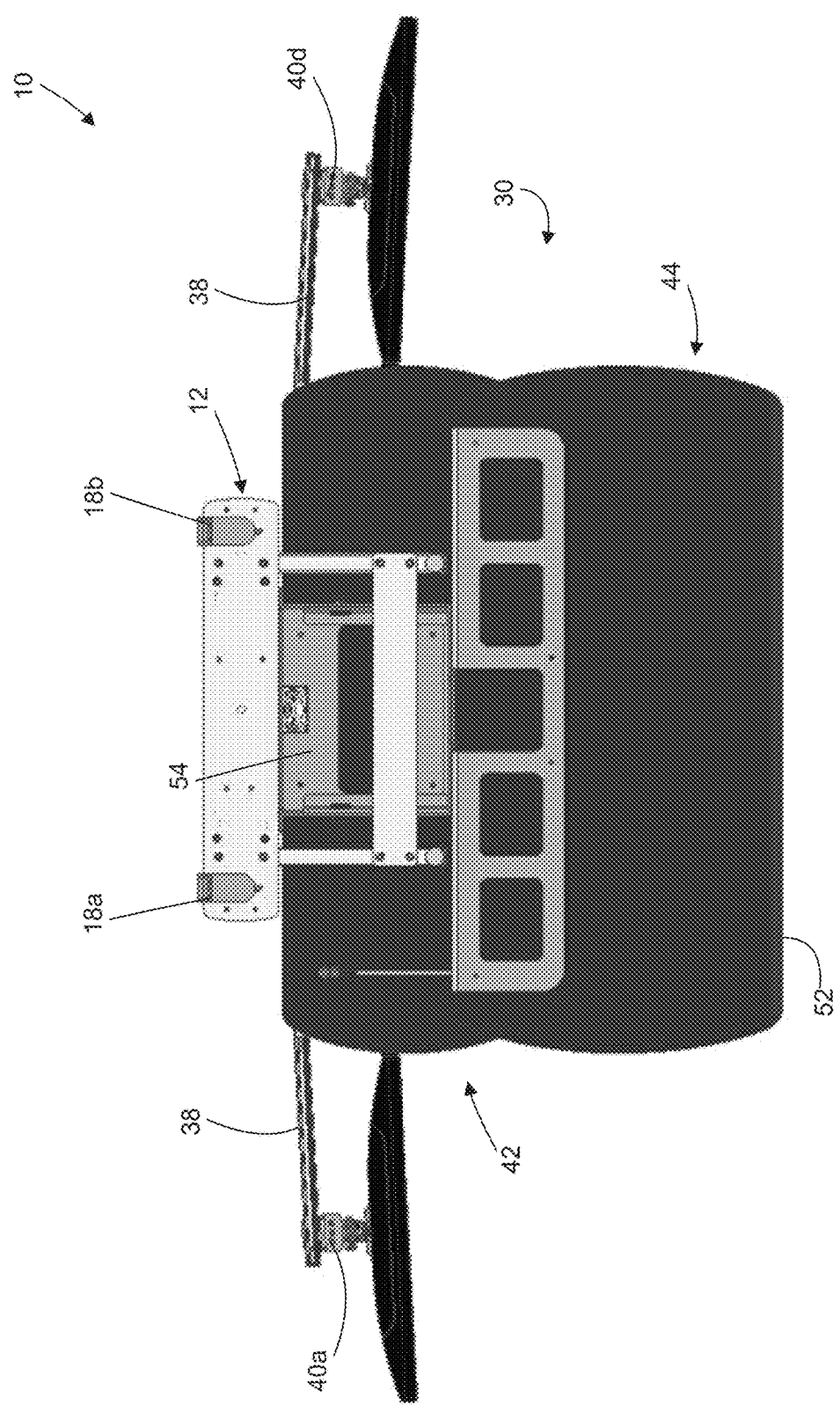
FIG. 3 is a bottom plan view of the sit-stand workstation shown in FIG. 1.
Figure 4:
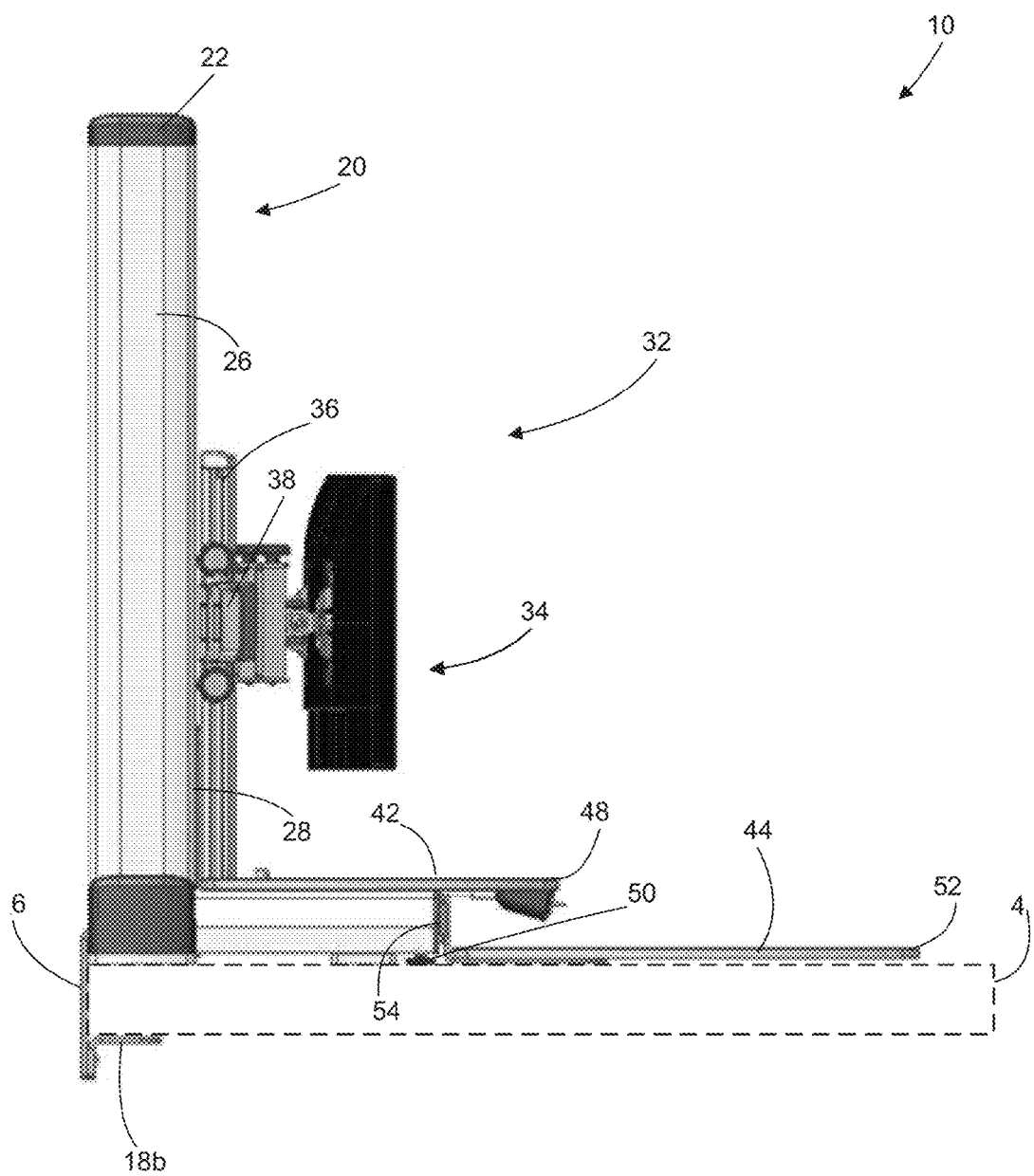
FIG. 4 is a side elevational view of the sit-stand workstation shown in FIG. 1 attached to a support surface, with the support surface shown in phantom.
Figure 5:
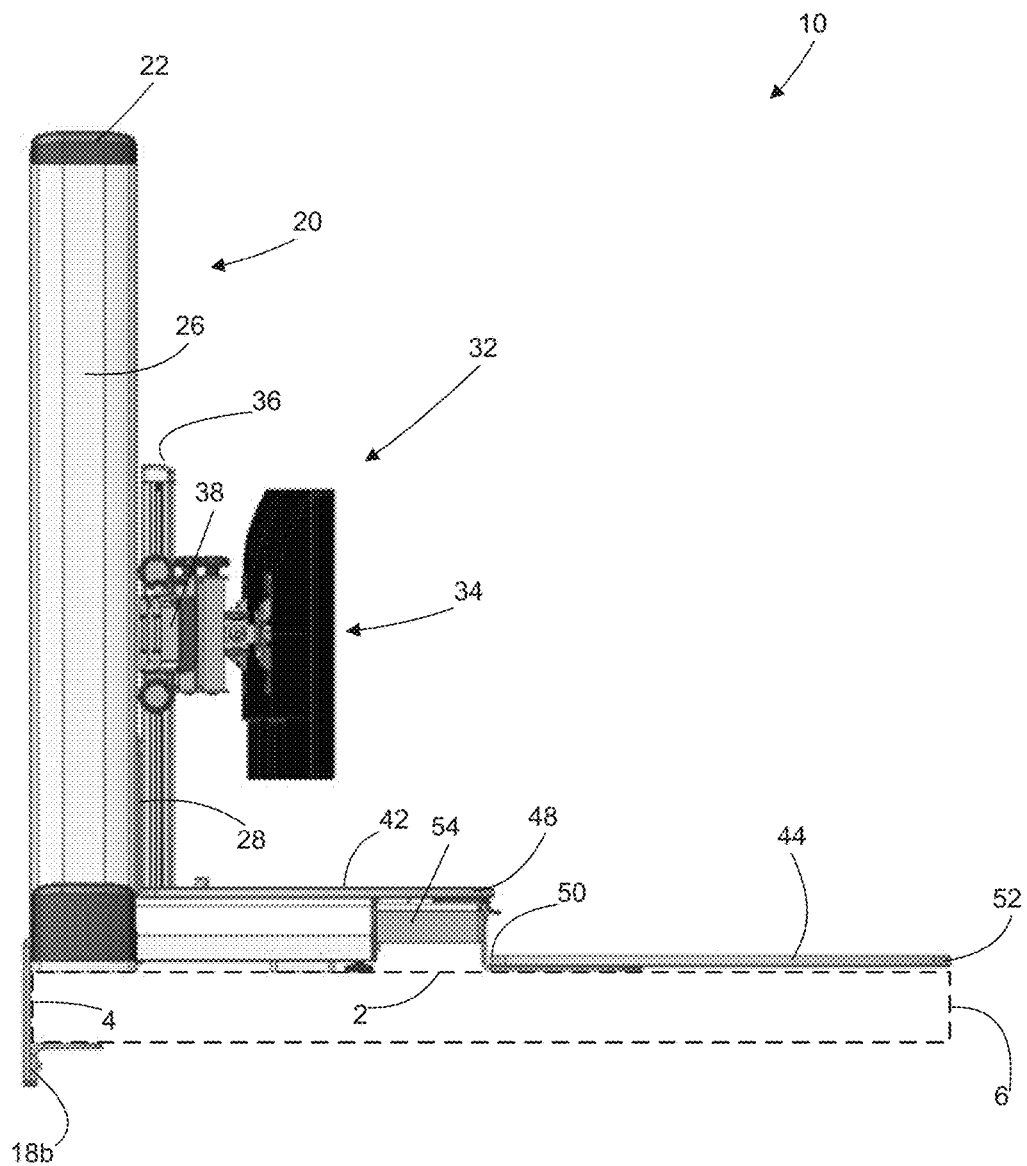
FIG. 5 is the view of FIG. 4 with a lower worksurface extended such that the edge of the lower worksurface and the edge of the support surface are aligned.
Figure 6:
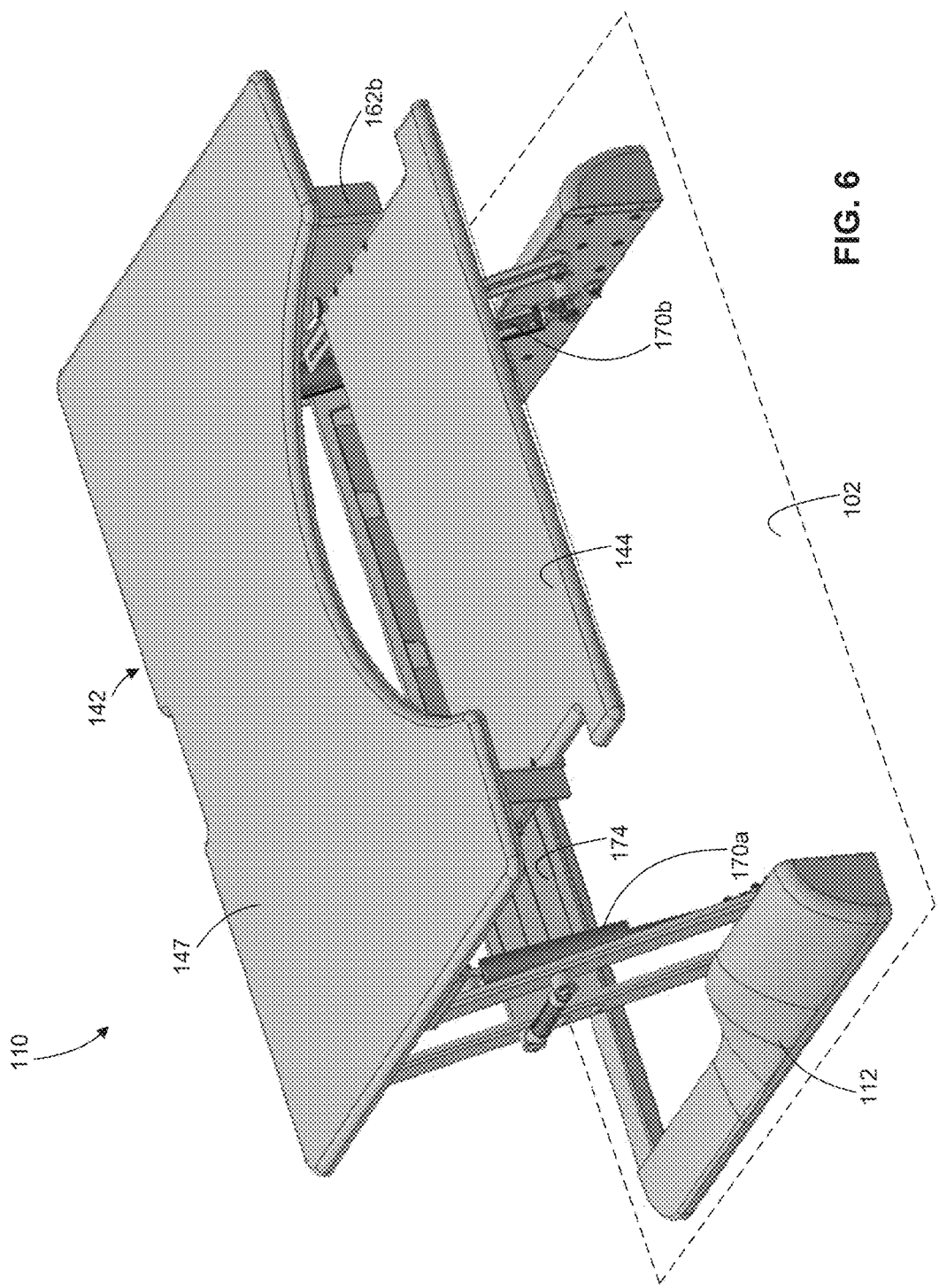
FIG. 6 is a front perspective view of an embodiment of a sit-stand workstation in accordance with the present disclosure.
Figure 7:
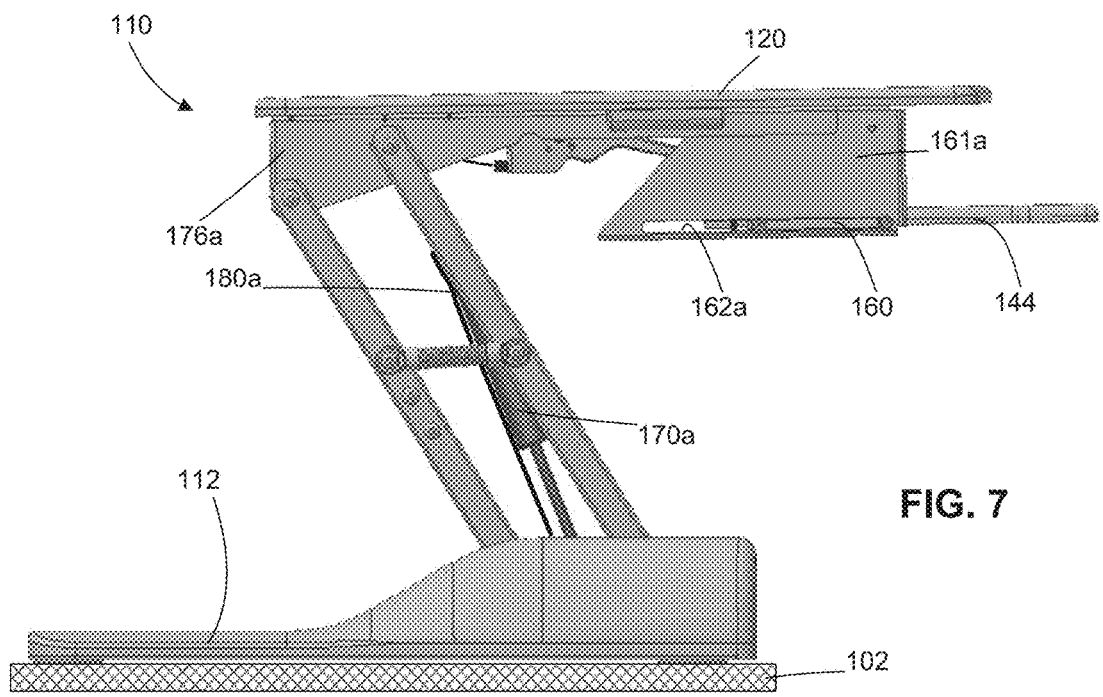
FIG. 7 is a side view of the sit-stand workstation of FIG. 6, with the workstation in its fully raised position and the lower worksurface thereof in its fully extended position.
Figure 8:
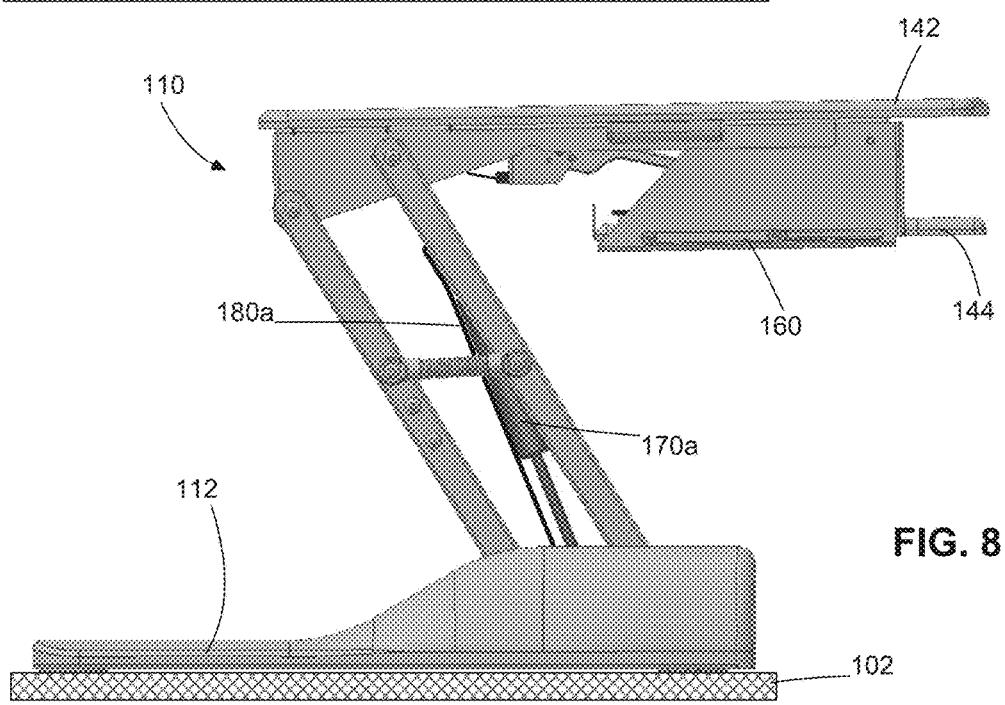
FIG. 8 is a side view of the sit-stand workstation of FIG. 6, with the workstation in its fully raised position and the lower worksurface thereof in its fully stowed position.
Figure 9:
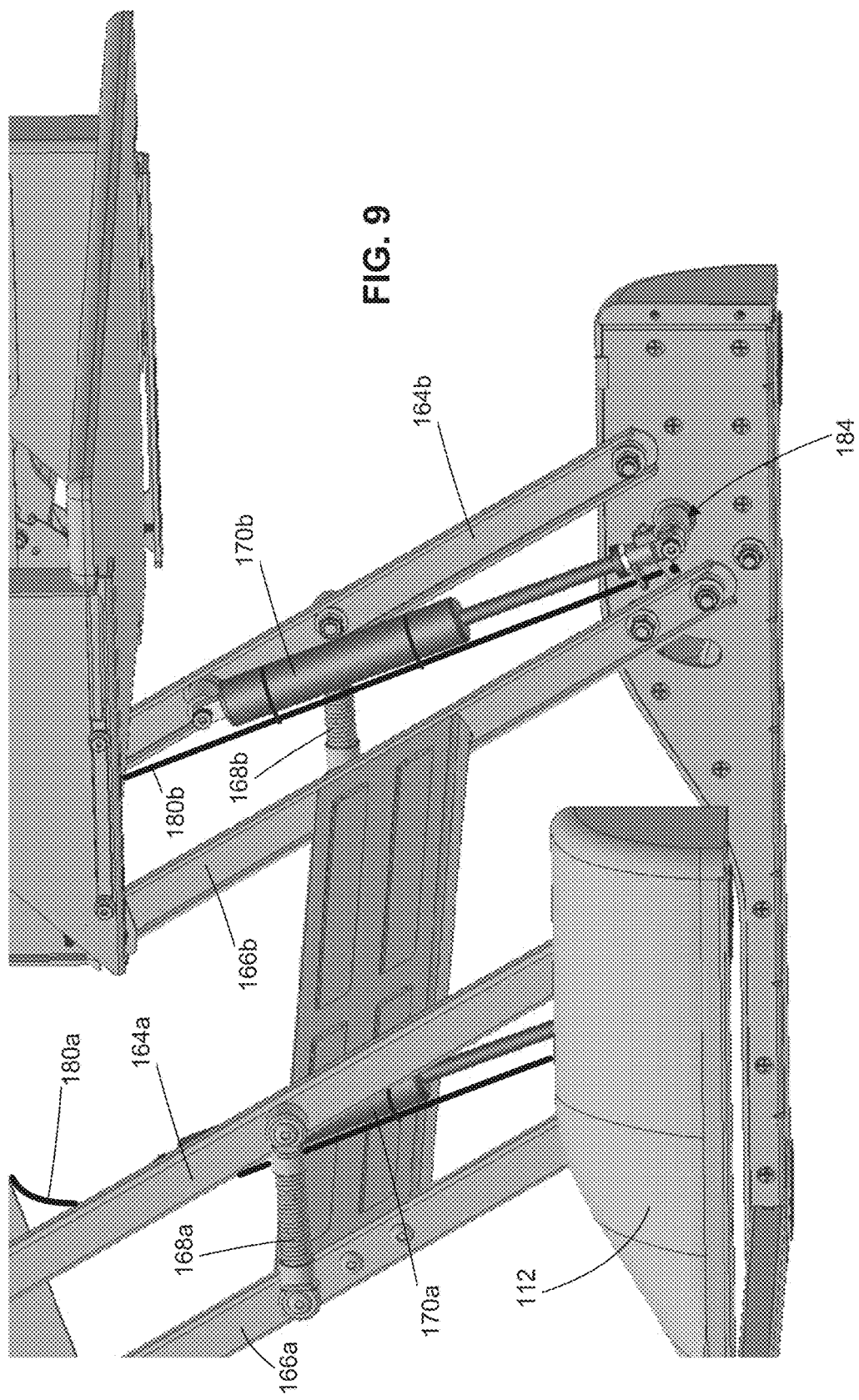
FIG. 9 is a perspective front view of the sit-stand workstation of FIG. 6, showing portions of the raising and lowering mechanism thereof.

Referring to FIGS. 3-5, connecting the lower worksurface 44 to the lift 28 is an extendable member 54 that is configured to move the lower worksurface 44 in a longitudinal direction between a retracted position (see FIG. 4) and an extended position (see FIG. 5). In other words, when the workstation 10 is attached to the support surface 2, the extendable member 54 is operable to adjust the depth position of the lower worksurface 44, as desired by the user, between the rear edge 6 and the front edge 4, including potentially beyond the front edge 4 if so desired by the user, provided that the extendable member 54 is constructed to have sufficient adjustable length. This is to allow a user to configure the position of the lower worksurface 44 so that the front edge 52 of the lower worksurface 44 is aligned with the front edge 4 of the support surface 2 (see FIG. 5.). In such circumstances, when the worksurface 30 is in its lowered position, as seen in FIGS. 4 and 5, any potential discomfort the user may experience from having a hand or an arm resting on two different surfaces (i.e., the lower worksurface 44 and the support surface 2) while using the workstation 10 in a lowered position is significantly reduced or eliminated.

In one embodiment, the upper worksurface 42 has its longitudinal position relative to the lift 28 and its vertical position relative to the lower worksurface 44 fixed. In other words, while the lower worksurface 44 is able to move longitudinally closer to and further from the base 12 and the upper worksurface 42 through the expansion and retraction of the extendable member 54, the height difference between the upper worksurface 42 and the lower worksurface 44 does not change. As seen in FIG. 5, when the extendable member 54 is in an extended position, the rear edge 50 of the lower worksurface 44 is vertically aligned the front edge 48 of the upper worksurface 42.

The extendable member 54 can be configured to be operated manually or via an electric motor. In one embodiment, the extendable member 54 utilizes a telescoping rail system that includes a pair of telescoping rail sets which are manually adjustable for positioning the longitudinal position of the lower worksurface 44. In another embodiment, the extendable member 54 utilizes a rack and pinion mechanism, which can be operated via an electronic controller.

A method of installing the workstation 10 on a support surface 2 will now be discussed. At the outset, the workstation 10 is attached to the support surface 2 so that the positions of the base 12 and the column 20 are fixed. In the embodiment shown in FIGS. 1-5, this involves clamping the fasteners 18a, 18b to the rear edge 6 of the support surface 2. In other embodiments, this clamping/securing step may be performed elsewhere on the support surface 2 or omitted from the method of installation. Once the base 12 has been secured to the support surface 2, the lift 28 is lowered to its lowest position along the column 20 so that the worksurface 30 is adjacent to the support surface 2. The extendable member 54 is then moved from its retracted position to an extended position such that the front edge 52 of the lower worksurface 44 is vertically aligned with the front edge 4 of the support surface 2. Thereafter, the lower worksurface 44, along with the upper worksurface 42 and the monitor support assembly 32, can be raised or lowered by the lift 28 as desired by the user.

FIGS. 6-14 illustrate a second embodiment of a sit-stand workstation 110 in accordance with the present disclosure. The elements illustrated in FIGS. 6-14 which correspond, either identically or substantially, to the elements described above with respect to the embodiment shown in FIGS. 1-5 have been designated by corresponding reference numbers increased by one hundred. Any element referenced below and identified in the attached drawings should be assumed as having the same or similar structure and function as its corresponding element shown in previous figures, except where specifically indicated otherwise below.

Referring generally to FIGS. 6-14, an embodiment of a sit-stand workstation 110 in accordance with the present disclosure is shown. In this embodiment, the workstation 110 is a "collapsible"-style sit-stand workstation that is shipped fully assembled and is designed to be placed on an existing worksurface 102 (e.g., a user's existing desk or table) and be immediately ready to use. The workstation 110 has a base member 112 that rests upon the existing worksurface 102 and supports the remainder of the workstation 110 therefrom. The workstation 110 also comprises an upper worksurface 142 having a top surface 147 and a bottom surface 149, and a lower worksurface 144 (i.e., a keyboard tray) that is extendable or retractable beneath the upper worksurface 142, to allow the lower worksurface 144 to be extended between a fully-extended position (see FIG. 7) in which it may be easily accessed by the user and a fully-retracted position (see FIG. 8) in which it is stowed away for later use. The top surface 147 of the upper worksurface 142 is planar and may be used to support one or more electronic displays thereon.

A support assembly 160 is used to support the lower worksurface 144 from the bottom surface 149 of the upper worksurface 142 via a pair of support brackets 161a, 161b. The support brackets 161a, 161b each contains a slot 162a, 162b therein, which allow for the extension and retraction of the lower worksurface 144 via interaction with sliding hardware (not labeled) that attach to the lower worksurface 144 through the slots 162a, 162b.

In this embodiment, the upper worksurface 142 is supported from the base member 112 via four support members, two on each side of the workstation 110. Specifically, front support member 164a and rear support member 166a are connected together by spring 168a on a first side of the workstation 110, and front support member 164b and rear support member 166b are connected together by spring 168b on a second side of the workstation 110. The ends of a gas cylinder 170a are fixedly and rotatably connected between the base member 112 and the front support member 164a, and the ends of a gas cylinder 170b are fixedly and rotatably connected between the base member 112 and the front support member 164b. In this way, as discussed in further detail below, the gas cylinders 170a, 170b impart force to the front support members 164a, 164b to raise and lower the upper worksurface 142 and lower worksurface 144 as desired by the user. The springs 168a, 168b act, respectively, to transfer some of the supporting force imparted by the gas cylinders 170a, 170b on the front support members 164a, 164b to the rear support members 166a, 166b. A cross support 174 is attached between the rear support members 166a, 166b to add stability to the workstation 110 and prevent twisting thereof.

A pair of arm support brackets 176a, 176b are attached to the bottom surface 149 of the upper worksurface 142. The upper ends of the front support member 164a and rear support member 166a are pivotally attached to the arm support bracket 176a and the upper ends of the front support member 164b and rear support member 166b are pivotally attached to the arm support bracket 176b.

In their default state, the gas cylinders 170a, 170b are in non-adjustable states, such that their effective length cannot be adjusted. In this default state, the gas cylinders 170a, 170b act to support the upper worksurface 142 and the lower worksurface 144 in the desired height position with respect to the existing worksurface 102. When the user desires to adjust the effective height of the workstation 110, the gas cylinders 170a, 170b are placed into their adjustable states as described below in detail. When the gas cylinders 170a, 170b are in this adjustable state, the user may either lift upwardly or press downwardly on the upper worksurface 142 and/or lower worksurface 144, thus adjusting the effective height of the workstation 110. In this embodiment, a grip 199 is also attached to the bottom surface 149 of the upper worksurface 142 to aid the user when pulling upwardly or pushing downwardly on the upper worksurface 142. In this embodiment, the grip 199 is a dummy handle without any moving parts.

In this embodiment, the gas cylinders 170a, 170b each have a release button (only release button 172 of gas cylinder 170b shown) that, when depressed, place the respective gas cylinder 170a, 170b in its adjustable state. A release mechanism is associated with each of the gas cylinders 170a, 170b. Only release mechanism 184 associated with gas cylinder 170b is shown in the Figures, although it should be understood that gas cylinder 170a is equipped with an identical release mechanism 184. In this embodiment, a bracket 186 that is fixed to the base member 112 pivotally supports a lever 188 that, when rotated within the bracket 186, depresses the release button 172 of the gas cylinder 170b so that the gas cylinder 170b is placed into its adjustable state. It should be understood that in FIG. 13, the bracket 186 has been rendered transparent so that the release button 172 and lever 188 can be appropriately shown. Lever 188 has a hook 190 at the lever end thereof that supports an end of a release cable 180b, as will be discussed in further detail below. In this embodiment, the release mechanism 184 functions as a second-class lever with the fulcrum end at the top and the "load" (the depressible release button 172) between the fulcrum end and lever end (bottom) of the release mechanism 184.

Figure 10:
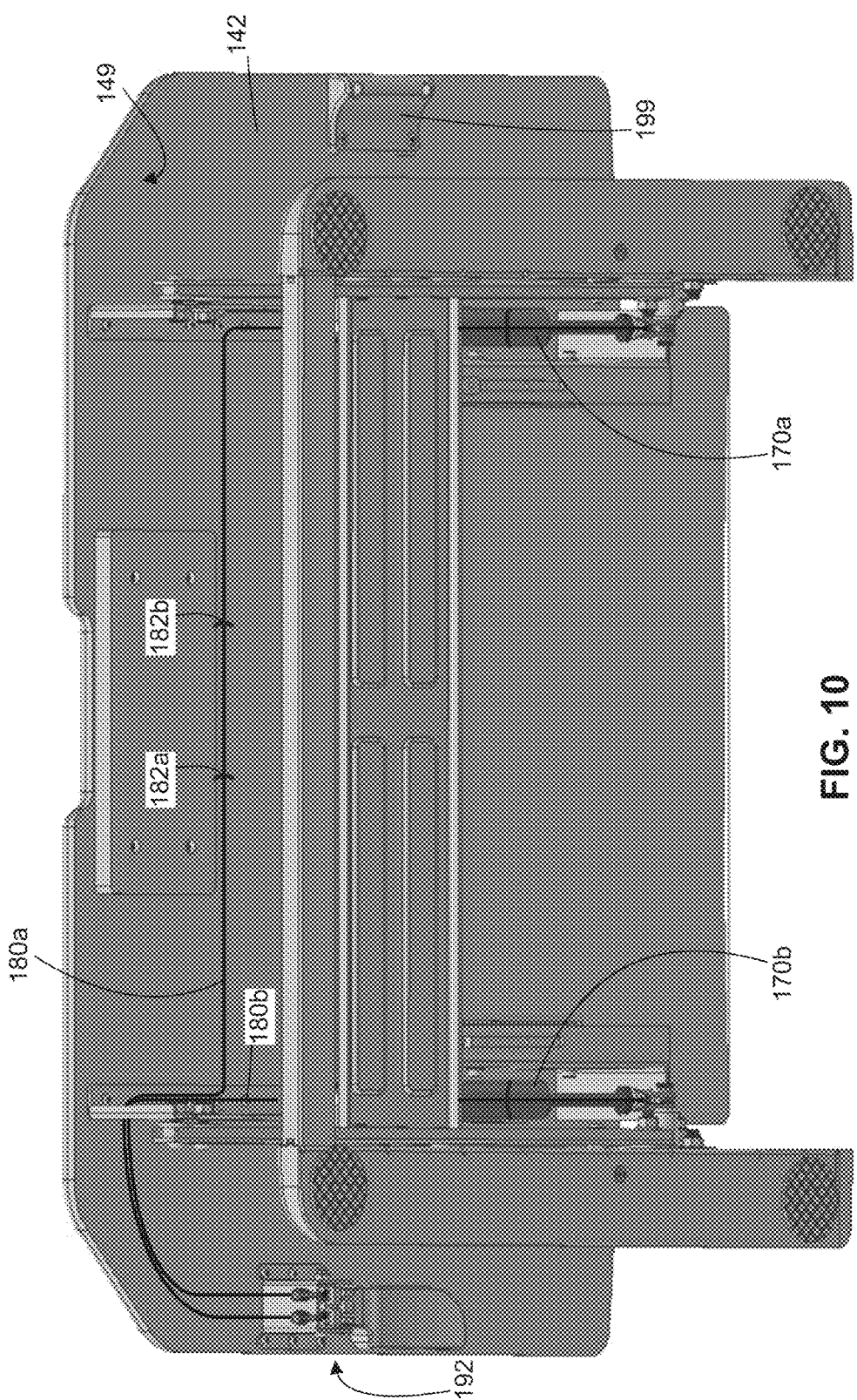
FIG. 10 is a perspective bottom view of the sit-stand workstation of FIG. 6, showing the release cables and handle assembly of the raising and lowering mechanism thereof.
Figure 11:
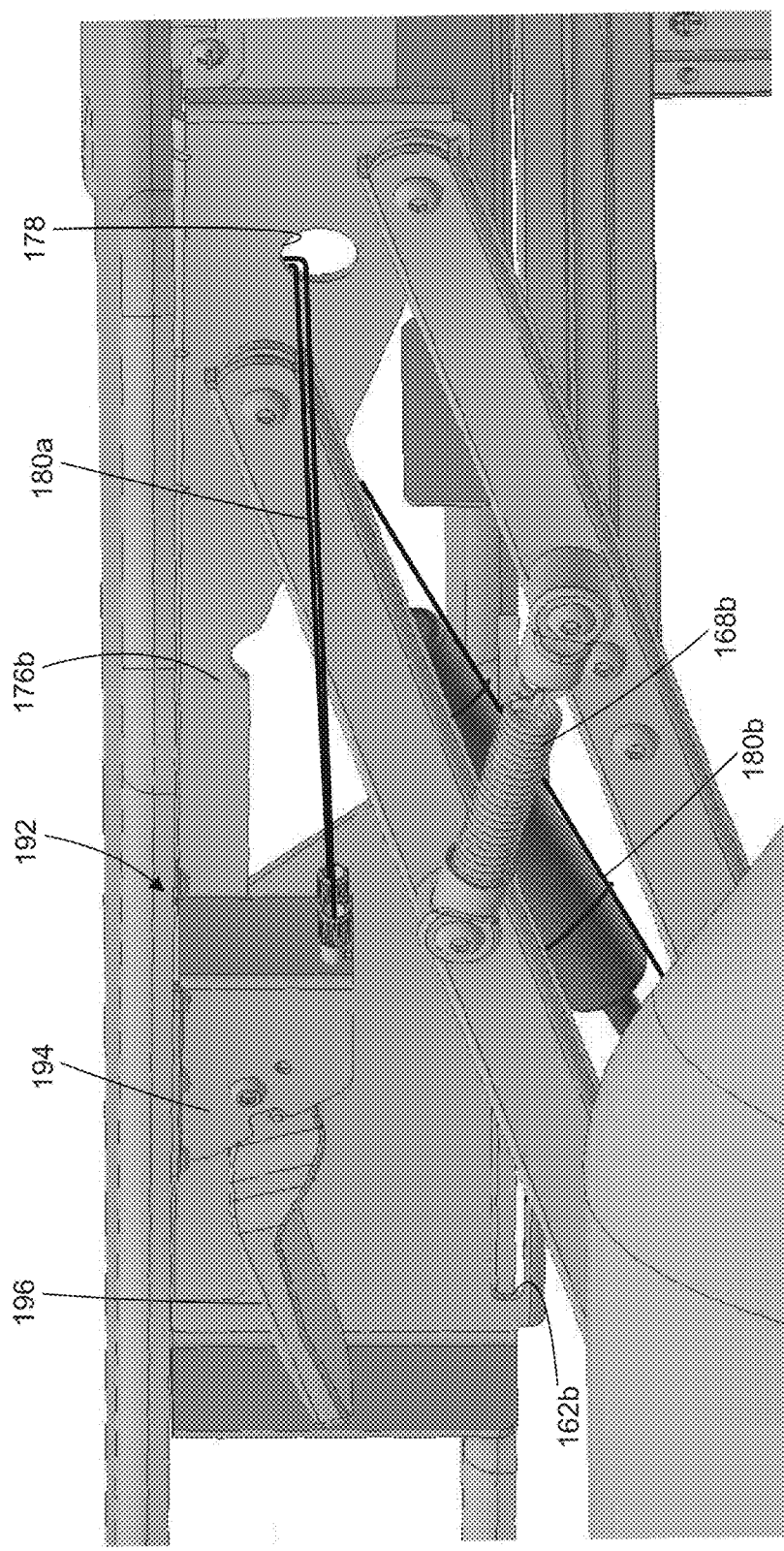
FIG. 11 is a view of the handle assembly thereof.

In this embodiment, a release cable 180a is attached at one end to the gas cylinder 170a (via its release mechanism) and at its other end to a handle assembly 192, and the release cable 180b is attached at one end to the gas cylinder 170b (via the release mechanism 184) and at its other end to the handle assembly 192. In this embodiment, the release cables 180a, 180b are routed along the outer surfaces of the respective gas cylinders 170a, 170b and held in place there by clips (not labeled). As shown in FIG. 10, the release cable 180a is routed along the bottom surface 149 of the upper worksurface and held in place with a plurality of support clips 182a, 182b. Any number and type of support clips may be used within the scope of this disclosure, so long as they do not interfere with longitudinal movement of the release cables 180a, 180b.

Figure 12:
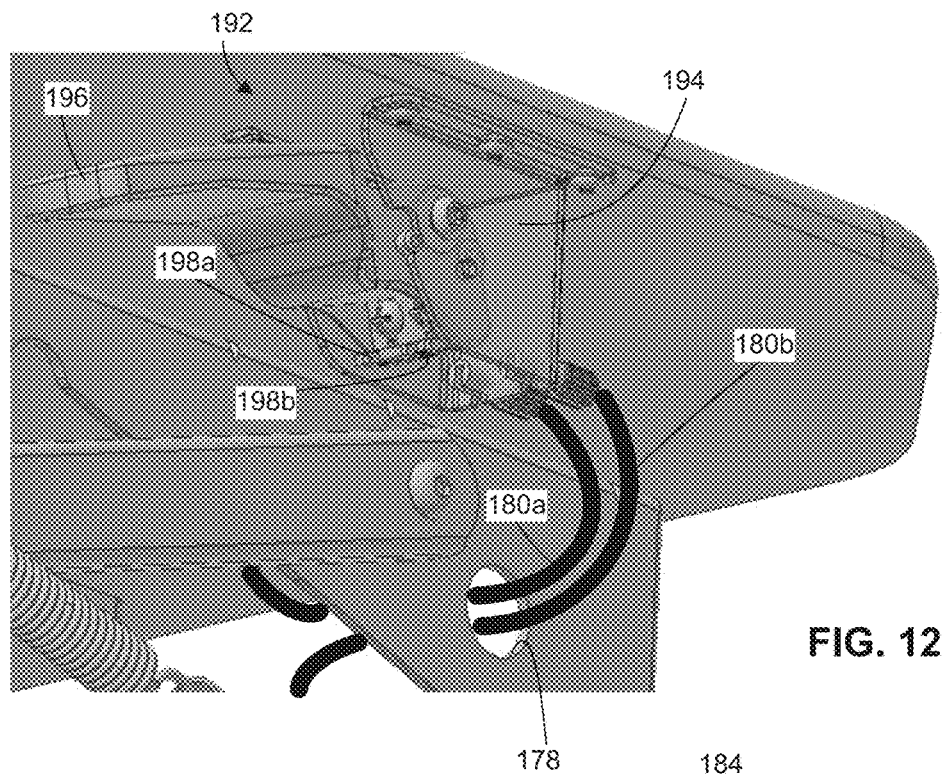
FIG. 12 is a view of the handle assembly thereof.
Figure 13:
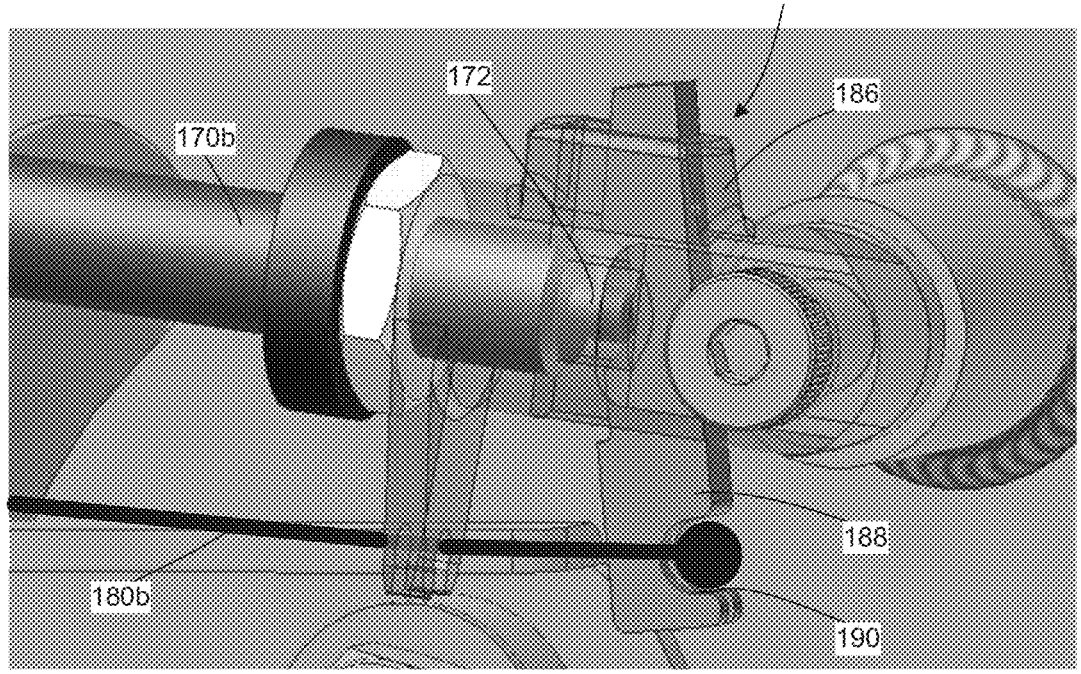
FIG. 13 is a view of the gas cylinder release mechanism thereof.

In this embodiment, both release cables 180a, 180b are then routed through a hole 178 located in the arm support bracket 176b and attach to the handle assembly 192. The handle assembly 192 is supported from the bottom surface 149 of the upper worksurface 142 via a support bracket 194, and includes a moveable lever 196 that is biased into a downward position as shown in FIG. 12. A terminal end of the release cable 180a attaches through the support bracket 194 and is held in place via a cable end holder 198a that is integral with the lever 196, and a terminal end of the release cable 180b attaches through the support bracket 194 and is held in place via a cable end holder 198b that is integral with the lever 196. It should be understood that, in FIG. 12, the support bracket 194 has been rendered transparent so that the remaining portions of the handle assembly 192 can be seen for purposes of discussion. It should also be understood that, in FIG. 12, the terminal ends of the release cables 180a, 180b are omitted entirely from view so as not to obscure portions of the lever 188 (e.g., cable end holders 198a, 198b) from view. When the lever 196 is depressed upwardly, the release cables 180a, 180b are pulled in a direction generally to the left side of FIG. 12. This acts on the other terminal end of each of the release cables 180a, 180b as described above in detail, thus placing the gas cylinders 170a, 170b into their adjustable states so that the effective height of the workstation 110 may be adjusted, as long as the lever 196 remains depressed.

All examples and conditional language recited herein are intended for pedagogical purposes to aid the reader in understanding the principles of the present disclosure and the concepts contributed by the inventor in furthering the art. As such, they are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It is to be understood that the embodiments described herein are merely exemplary and that a person skilled in the art may make many variations and modifications without departing from the spirit and scope of the disclosure. All such variations and modifications are intended to be included within the scope of the invention, as defined by the following claims.

We claim:

1. An adjustable workstation that is supportable from a support surface, the adjustable workstation comprising:
   a base;
   an upper worksurface attached to the base and positioned at a first height from the base;
   a lower worksurface attached to the base and positioned at a second height from the base, the second height being less than the first height, the lower worksurface having a bottom surface and a front edge; and
   an extendable member attached to the lower worksurface at a first end and attached to one of the base and the upper worksurface at a second end, the extendable member being configured to permit the front edge of the lower worksurface to move between a first position and a second position in a non-vertical direction while the base and the upper worksurface remain stationary, the first position placing the front edge of the lower worksurface at a first longitudinal distance from the upper work surface and the second position placing the front edge of the lower worksurface at a second longitudinal distance from the upper worksurface, the second longitudinal distance being greater than the first longitudinal distance;
   wherein the upper worksurface and the lower worksurface are configured to be raised and lowered together between a fully raised position and a fully lowered position.

2. The adjustable workstation of claim 1, wherein the upper worksurface is positioned at a vertical distance from the lower worksurface, the vertical distance being fixed when the front edge of the lower worksurface is moved between the first position and the second position and when the upper worksurface is moved between the fully raised position and the fully lowered position.

3. The adjustable workstation of claim 1, wherein the base includes a support column to which the upper and lower worksurfaces are attached, wherein the upper and lower worksurfaces are configured to be raised and lowered along a height of the support column.

4. The adjustable workstation of claim 1, further comprising at least one clamp for releasably fastening the adjustable workstation to the support surface.

5. An adjustable workstation that is supportable from a support surface, the workstation comprising:
   a base having a top surface, a bottom surface, and a fastener for securing the base to the support surface;
   a column having a top end and a bottom end, the bottom end of the column being attached to the top surface of the base, the column including a lift configured to be movable between a lowered position located adjacent to the bottom end of the column and a raised position located between the top end and the bottom end of the column;
   a worksurface attached to the lift, the worksurface including a rear edge located proximate to the column and a front edge located distant from the column; and
   an extending member connecting the lift to the worksurface, the extending member being configured to allow the location of the worksurface to be movable between a retracted position and an extended position, the retracted position placing the front edge of the worksurface at a first distance from the column and the extended position placing the front edge of the worksurface at a second distance from the column, the second distance being greater than the first distance.

6. An adjustable workstation that is supportable from a support surface, the adjustable workstation comprising:
   a base that is supportable from the support surface;
   an upper worksurface attached to the base and positioned at a first height from the base; and
   a lower worksurface attached to the base and positioned at a second height from the base, the second height being less than the first height, the lower worksurface having a bottom surface and a front edge;
   wherein the upper worksurface and the lower worksurface are configured to be raised and lowered together between a fully raised position and a fully lowered position; and
   wherein the lower worksurface is movable in a direction parallel to the upper worksurface between a first position and a second position while the base and the upper worksurface remains stationary, the first position placing the front edge of the lower worksurface at a first distance from the upper work surface and the second position placing the front edge of the lower worksurface at a second distance from the upper worksurface, the second distance being greater than the first distance.

7. The adjustable workstation of claim 6, wherein the lower worksurface is not in contact with the support surface when the adjustable workstation is placed in its fully raised position and wherein the lower worksurface is placed in contact with the support surface when the adjustable workstation is placed in its fully lowered position.

8. The adjustable workstation of claim 6, wherein the lower worksurface comprises a keyboard tray.

\* \* \* \* \*